(12) United States Patent
Korenfeld et al.

(10) Patent No.: US 11,124,982 B2
(45) Date of Patent: Sep. 21, 2021

(54) POOL CLEANER WITH DRIVE MOTOR NAVIGATION CAPABILITIES

(71) Applicant: Maytronics Ltd., Kibbuts Yizrael (IL)

(72) Inventors: Semion Korenfeld, Yokneam (IL); Shay Witelson, Kibbutz Yisrael (IL)

(73) Assignee: MAYTRONICS LTD., Kibbutz Yizrael (IL)

( * ) Notice: Subject to any disclaimer, the term of this patent is extended or adjusted under 35 U.S.C. 154(b) by 705 days.

(21) Appl. No.: 15/600,794

(22) Filed: May 22, 2017

(65) Prior Publication Data

US 2017/0342733 A1 Nov. 30, 2017

Related U.S. Application Data

(63) Continuation-in-part of application No. 15/586,288, filed on May 4, 2017.

(60) Provisional application No. 62/341,119, filed on May 25, 2016.

(51) Int. Cl.
*E04H 4/16* (2006.01)
*G05D 1/02* (2020.01)
*C02F 1/00* (2006.01)
*C02F 103/42* (2006.01)

(52) U.S. Cl.
CPC .......... *E04H 4/1654* (2013.01); *C02F 1/001* (2013.01); *G05D 1/0212* (2013.01); *C02F 2103/42* (2013.01); *G05D 2201/0203* (2013.01)

(58) Field of Classification Search
CPC ....... E04H 4/16; E04H 4/1654; E04H 4/1663; G05D 1/0875

USPC ........ 15/1.7; 318/568.12; 210/167.16, 416.2; 901/1

See application file for complete search history.

(56) References Cited

U.S. PATENT DOCUMENTS

| | | | | |
|---|---|---|---|---|
| 5,435,031 A | * | 7/1995 | Minami | E04H 4/1654 15/1.7 |
| 2007/0067930 A1 | * | 3/2007 | Garti | E04H 4/1654 15/1.7 |
| 2015/0101135 A1 | * | 4/2015 | Witelson | B66B 9/00 15/1.7 |

OTHER PUBLICATIONS

Youtube, Dolphin Premier REview; Rich Escalante http://youtube.com/watch?v+rOZMebaXztA Jul. 20, 2013 (Year: 2013).*

* cited by examiner

*Primary Examiner* — Monica S Carter
*Assistant Examiner* — Abbie E Quann
(74) *Attorney, Agent, or Firm* — Reches Patent

(57) ABSTRACT

A pool cleaner for cleaning a pool, the pool cleaner may include a filtering element for filtering fluid; at least one sensor for sensing an actual yaw of the pool cleaner and an actual orientation of the pool cleaner; at least one steering element that is configured to move the pool cleaner along a cleaning path during a cleaning process of a certain region of a sidewall of the pool; wherein the cleaning path comprises a cleaning path segment that has a cleaning path segment yaw that is a non-vertical yaw; wherein the cleaning path comprises less than a predetermined number of turns; wherein the predetermined number of turns is associated with another cleaning path that mostly includes vertical yaw cleaning path segments; and a controller that is configured to control the at least one steering element, based on the actual yaw of the pool cleaner.

18 Claims, 18 Drawing Sheets

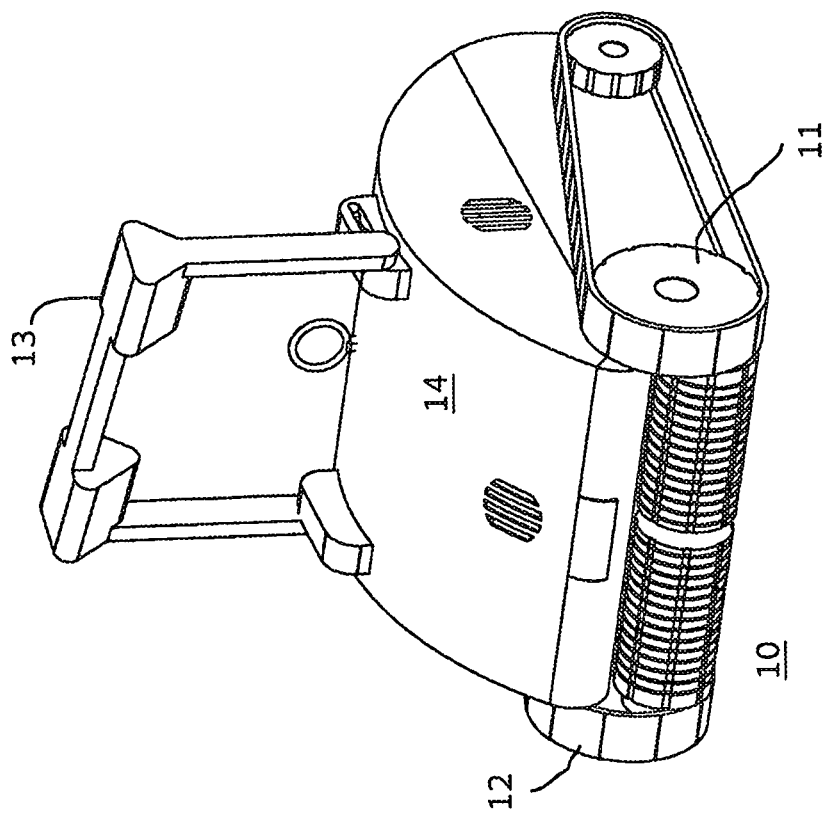
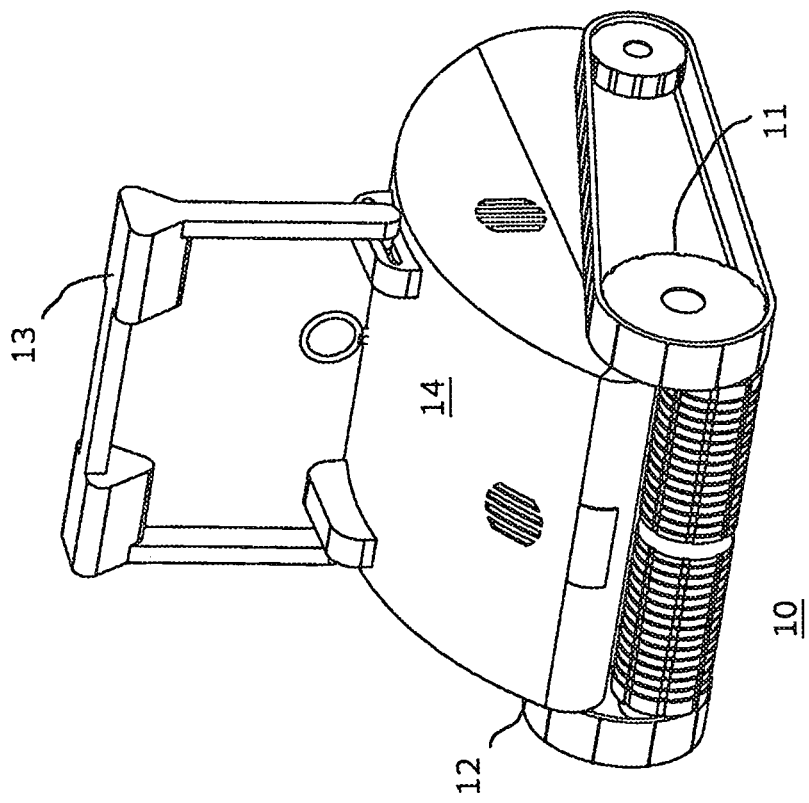
FIG. 3

POOL CLEANER WITH DRIVE MOTOR NAVIGATION CAPABILITIES

CROSS REFERENCE

This application claims priority from US provisional patent 62/341,119 filing date May 25, 2016. This application is a continuation in part of U.S. patent application Ser. No. 15/586,288 filing date May 4, 2017. Both applications are incorporated herein by reference.

BACKGROUND

Cleaning robots are known in the art. They are expected to clean the pool by brushing the surfaces of the pool and filtering the fluid of the pool by removing foreign particles from that fluid.

Cleaning robots may also be required to climb on vertical wall surfaces, stairs, ledges, and the like to brush these surfaces and remove dirt or scum lines that accumulate at the waterlines.

It is of importance to brush and sweep walls because, similar to the deep ends of pools, they are even more important areas of weakness that allow algae growths to expand unchecked thereby infecting the entire pool surfaces.

In order to climb on vertical pool walls, pool cleaners are required to traverse various obstacles that may be mounted on said vertical walls for example: spot lamps, return jet outlets, ladders.

Usually, pool cleaners are programmed to climb walls until reaching the water line followed by a descent back to the floor. The wall cleaning comprises performing vertical travelling in imaginary vertical boxes or strips.

The continuous ascending and descending on pool walls is a time-consuming activity.

There is a growing need to provide a pool cleaner that is capable of travelling on the walls in an efficient and effective manner.

There is a growing need to provide a pool cleaner that is capable to traverse various obstacles that may be mounted on vertical walls (or nearly vertical walls) of a pool.

SUMMARY

There may be provided a pool cleaner for cleaning a pool, the pool cleaner may include a filtering element for filtering fluid; at least one sensor for sensing an actual yaw of the pool cleaner and an actual orientation of the pool cleaner; at least one steering element that may be configured to move the pool cleaner along a cleaning path, during a cleaning process of a certain region of a sidewall of the pool; wherein the cleaning path may include a cleaning path segment that has a cleaning path segment yaw that may be a non-vertical yaw; wherein the certain region may be fully submerged; and a controller that may be configured to control the at least one steering element, based on the actual yaw of the pool cleaner.

The cleaning path segment may be horizontal.

The cleaning path may be parallel (or oriented) to a floor of the pool, to the horizon and/or may be parallel (or oriented) to a water level of the pool.

Generally, horizontal "on the wall" movement places continual forces on the pool cleaner to slip down towards the bottom surface due to gravitation.

Generally, a sideways angled movement "at the water line" places continual forces on the pool cleaner to slip sideways towards the bottom surface due to gravitation.

Any such gravitational forces require continual correction of the yaw.

The at least one steering element may be configured to move the pool cleaner at a forward or in a substantially linear direction along the cleaning path segment.

The at least one steering element may be configured to move the pool cleaner at a backward or in a substantially linear direction along the cleaning path segment.

The at least one steering element may include a jetting module.

The at least one steering element may include a steering module that may be configured to independently drive different interfacing elements of the pool cleaner; wherein each interfacing element interfaces between the pool cleaner and the pool.

The at least one steering element further may include a jetting module.

The at least one steering element further may include a maneuverable handle.

The at least one steering element further may include a jetting module and a maneuverable handle.

The certain region may include an obstacle.

The certain region may be free of obstacles.

The at least one sensor is configured to detect that the pool cleaner reached the waterline; wherein the controller is configured to control the at least one steering element to position the pool cleaner at a desired waterline non-vertical yaw and to move the pool cleaner along the waterline while the pool cleaner is positioned at the desired waterline non-vertical yaw.

The at least one steering element may be configured to move the pool cleaner along multiple cleaning paths of the cleaning path, each of the multiple cleaning paths has a cleaning path segment yaw that may be non-vertical yaw.

The multiple cleaning path segments may overlap most the certain region.

The at least one steering element may be configured to move the pool cleaner along the cleaning path while maintaining in contact with the pool sidewall.

The certain region may be longer and wider than the pool cleaner.

A plurality of pool cleaning path segments out of the multiple pool cleaning paths may be parallel to each other and wherein the at least one steering element may be configured to turn the pool cleaner when moving between the plurality of pool cleaning path segments while maintaining contact with the pool sidewall.

The controller may be configured to determine the cleaning path to include a minimal number of pool cleaner turns.

The controller may be configured to determine the cleaning path to include less than a predetermined number of turns; wherein the predetermined number of turns may be associated with a cleaning path that mostly includes vertical yaw cleaning path segments.

The at least one steering element may be configured to move the pool cleaner along the cleaning path while performing a minimal number of turns.

The at least one steering element may be configured to move the pool cleaner along the cleaning path while performing less than a predetermined number of turns; wherein the predetermined number of turns may be associated with a cleaning path that mostly includes vertical yaw cleaning path segments.

There may be provided a pool cleaner for cleaning a pool, the pool cleaner may include a filtering element for filtering fluid; at least one sensor for sensing an actual yaw of the pool cleaner and an actual orientation of the pool cleaner; at least one steering element that may be configured to move the pool cleaner along a cleaning path, during a cleaning process of a certain region of a sidewall of the pool; wherein the cleaning path may include a cleaning path segment that has a cleaning path segment yaw that may be non-vertical yaw; wherein the at least one steering element may include a steering module that may be configured to independently drive different interfacing elements of the pool cleaner; wherein each interfacing element interfaces between the pool cleaner and the pool; and a controller that may be configured to control the at least one steering element, based on the actual yaw of the pool cleaner.

The at least one steering element further may include a jetting module.

The at least one steering element further may include a maneuverable handle.

The at least one steering element further may include a jetting module and a maneuverable handle.

There may be provided a pool cleaner for cleaning a pool, the pool cleaner may include a filtering element for filtering fluid; a controller that may be configured to determine a cleaning path of a region of a sidewall of the pool to include less than a predetermined number of turns; wherein the predetermined number of turns may be associated with a cleaning path that mostly includes vertical yaw cleaning path segments; at least one sensor for sensing an actual yaw of the pool cleaner and an actual orientation of the pool cleaner; at least one steering element that may be configured to move the pool cleaner along the cleaning path, during a cleaning process of the certain region; and wherein the controller if further configured to control the at least one steering element, based on the actual yaw of the pool cleaner.

There may be provided a pool cleaner for cleaning a pool, the pool cleaner may include a filtering element for filtering fluid; at least one sensor for sensing an actual yaw of the pool cleaner and an actual orientation of the pool cleaner; at least one steering element that may be configured to move the pool cleaner along a cleaning path, during a cleaning process of a certain region of a sidewall of the pool and while maintaining contact with the pool sidewall; wherein the cleaning path may include a cleaning path segment that has a cleaning path segment yaw that may be a non-vertical yaw; and a controller that may be configured to control the at least one steering element, based on the actual yaw of the pool cleaner.

There may be provided a method for operating a pool cleaner, the method may include sensing, by at least one sensor of the pool cleaner, an actual yaw of the pool cleaner and an actual orientation of the pool cleaner; cleaning, by the pool cleaner, a certain region of a sidewall of a pool while moving the pool cleaner, by at least one steering element of the pool cleaner, along a cleaning path that may include a cleaning path segment that has a cleaning path segment yaw that may be non-vertical yaw; wherein the at least one steering element may include a steering module that may be configured to independently drive different interfacing elements of the pool cleaner; wherein each interfacing element interfaces between the pool cleaner and the pool; and controlling, by a controller of the pool cleaner, the at least one steering element, based on the actual yaw of the pool cleaner.

There may be provided a method for operating a pool cleaner, the method may include sensing, by at least one sensor of the pool cleaner, an actual yaw of the pool cleaner and an actual orientation of the pool cleaner; cleaning, by the pool cleaner, a certain region of a sidewall of a pool while moving the pool cleaner, by at least one steering element of the pool cleaner, along a cleaning path that may include a cleaning path segment that has a cleaning path segment yaw that may be non-vertical yaw; wherein the certain region may be fully submerged; and controlling, by a controller of the pool cleaner, the at least one steering element, based on the actual yaw of the pool cleaner.

The method may include at least one out of:
a. moving the pool cleaner at a forward direction along the cleaning path segment.
b. moving the pool cleaner at a backward direction along the cleaning path segment.
c. Contacting by the pool cleaner, the certain region of the sidewall of the pool while performing a horizontal movement along the certain region of the sidewall of the pool.
d. Independently driving, by a steering module of the at least one steering element, different interfacing elements of the pool cleaner; wherein each interfacing element interfaces between the pool cleaner and the pool.
e. Moving the pool cleaner along multiple cleaning paths of the cleaning path, each of the multiple cleaning paths has a cleaning path segment yaw that is non-vertical yaw. The multiple cleaning path segments may or may not overlap most of the certain region.
f. Move the pool cleaner along the cleaning path while maintaining in contact with the pool sidewall.
g. Turning the pool cleaner when moving between a plurality of pool cleaning path segments while maintaining contact with the pool sidewall. The plurality of pool cleaning path segments (out of the multiple pool cleaning paths) may be parallel to each other.
h. Determining (for example by the controller of the pool cleaner or by another computer) the cleaning path to include a minimal number of pool cleaner turns.
i. Determining (for example by the controller of the pool cleaner or by another computer) the cleaning path to include less than the predetermined number of turns.
j. Moving, by the at least one steering element, the pool cleaner along the cleaning path while performing less than the predetermined number of turns.
k. Detecting, by the at least one sensor, that the pool cleaner reached the waterline.
l. Controlling, by the controller, the at least one steering element to position the pool cleaner at a desired waterline non-vertical yaw and to move the pool cleaner along the waterline while the pool cleaner is positioned at the desired waterline non-vertical yaw.
m. Determining the desired waterline non-vertical yaw based on a desired waterline propagation speed.

There may be provided a pool cleaner that may include any combination of any components illustrated in this patent application.

There may be provided a method that may include any combination of any steps illustrated in this patent application.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 illustrates a part of a pool, a pool cleaner with a floatation/ballast maneuverable type carrying handle;

Figure 1:
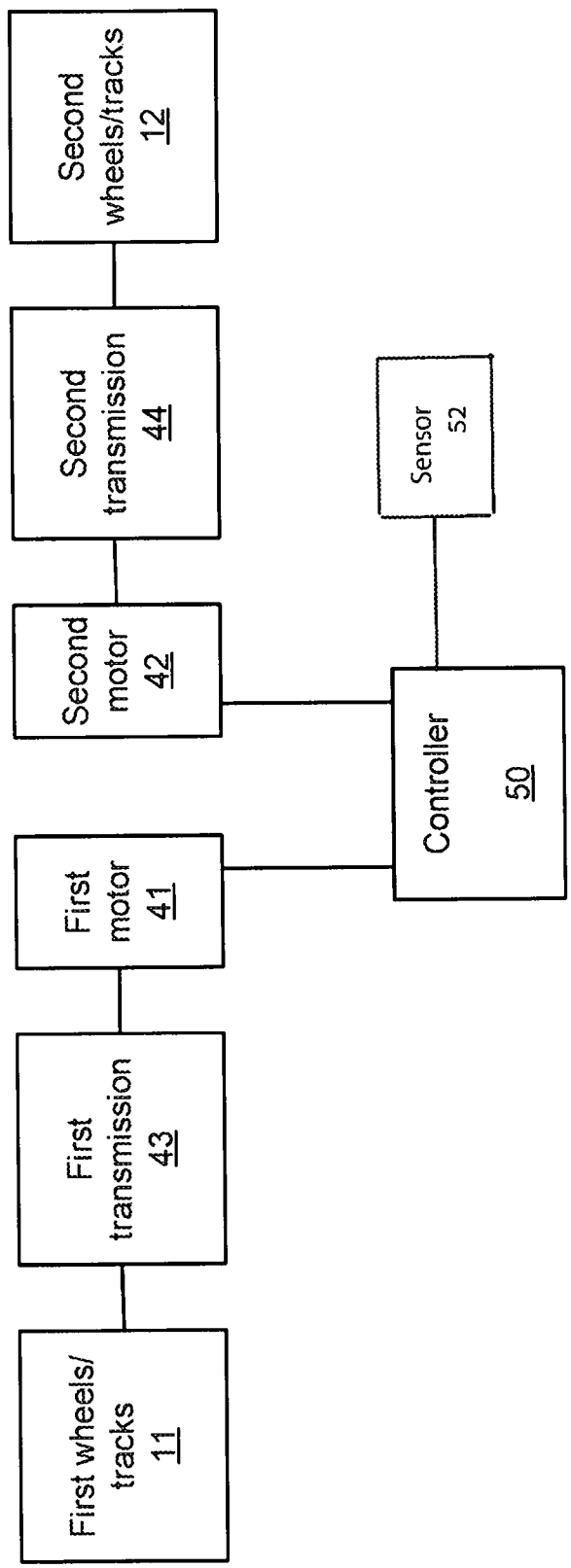
FIG. 1 illustrates a part of a pool cleaner according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

According to an embodiment of the invention there may be provided a pool cleaner that has the capability of bypassing obstacles located at sidewalls of a pool by performing bypassing maneuvers that utilize only a steering module that independently drives one or more first wheels and/or tracks positioned at a first side of the pool cleaner (or at least positioned at a first side in relation to a longitudinal axis that virtually passes through the middle of the pool cleaner) and independently drives one or more second wheels and/or tracks positioned at a second side of the pool cleaner (or at least positioned at second side in relation to a longitudinal axis that virtually passes through the middle of the pool cleaner).

The pool cleaner may or may not include a handle and/or may include a non-maneuverable handle. Having a pool cleaner without a maneuverable handle and especially without a floatation/ballast maneuverable type carrying handle reduced cost and simplifies the pool cleaner.

According to another embodiment of the invention the pool cleaner may use, in addition to the steering module, a maneuverable handle. The maneuverable handle may be used when bypassing obstacles located at sidewalls of a pool and/or may be used when the pool cleaner performs other movements (such as waterline movements).

According to another embodiment of the invention the pool cleaner may use, a jetting module for performing jet based steering (or jet assisted steering) that involves outputting fluid jets in order to assist in steering the pool cleaner.

According to yet another embodiment of the invention the pool cleaner may include, in addition to the steering module both jet based steering and a maneuverable handle. One or more of the steering module, jet based steering and the maneuverable handle may be used in different scenarios.

The pool cleaner may clean a certain region of a sidewall of the pool by moving along a cleaning path that include one or more cleaning path segments that have cleaning path segment yaws that are not vertical. The cleaning path segment yaws may deviate from the vertical yaw by a deviation that has an absolute value that may range between five and ninety degrees, especially between 30 and 90 degrees—especially between 45 and 85 degrees.

For example, the pool cleaner may clean the certain region of the pool while maintaining contact with the sideway of the pool, and/or without contacting the bottom of the pool and/or while performing a minimal number of turns.

The certain region could have been cleaned by performing mostly vertical movements. In this case, the pool cleaner would reach the bottom and perform a turn and eventually return to the certain region.

Such a cleaning process will require a predefined number of turns. The predefined number of turns is not smaller than the ratio between the horizontal dimension of the certain region and the width of the pool cleaner (or the width of the cleaning element—such as a brush wheel of the pool cleaner). The predefined number of turns may exceed the ratio where there is an overlap between parts of the certain region that are cleaned during different elevations of the pool cleaner.

In various cases, especially when the certain region has a horizontal dimension that exceeds the vertical dimension of the certain region—the suggested cleaning pattern will include fewer turns, may even be performed without leaving the sidewall—and thus may be faster and more efficient.

It should be noted that the cleaning of the certain region may involve departing from the sidewall of the pool and then returning to the sidewall of the pool—but the number of departures may be smaller in comparison to the predefined number of turns.

The pool cleaner may use multiple cleaning elements in order to maintain in contact with the sidewall of the pool even when turning of changing direction. For example—a strength of fluid jets may increase during turns or in locations that are more susceptible to detachment from the sidewall of the pool.

The certain region may be completely submerged, may be wider and longer than the pool cleaner, may include the entire sidewall, may include a majority (more than half) of the sidewall, may be partially submerged, and the like.

It should be noted that the pool cleaner may follow a cleaning path that may cover portion of multiple sidewalls—either one after the other may repetitively clean a part of a region of a sidewall, reach the bottom of the pool, propagate towards another sidewall, and clean an area of another region of another sidewall.

FIG. 1 illustrates a portion of a pool cleaner according to an embodiment of the invention.

The potion includes a sensor 52, a controller and a steering module that includes first motor 41, second motor 42, first transmission 43 for moving first interfacing elements such as first wheels/tracks 11 and a second transmission 44 for moving second interfacing elements such as second wheels/tracks 12.

The portion may include more than a single sensor.

Sensor 52 may be any sensor mentioned in the specification—such as but not limited to a yaw sensor, an orientation or tilt sensor, an inclinometer, and the like.

It should be noted that a single sensor may sense multiple parameters or may sense only a single parameter.

First motor 41 is coupled via first transmission 43 to the first wheels/tracks 11.

Second motor 42 is coupled via second transmission 44 to the second wheels/tracks 12.

First and second motors 41 and 42, first and second transmissions 43 and 44 form a steering module that may independently drive first and second track/wheels 11 and 12 respectively.

It is noted that the first and second motors 41 and 42 may drive one or more brushwheels in addition to (or instead of) driving first and second first and second track/wheels 11 and 12 respectively.

It is noted that the number of motors and/or transmissions may exceed two. Alternatively, a single motor and a single transmission that may independently drive the first and second track/wheels 11 and 12 may be provided.

It is also noted that each one of the first and second wheels/tracks 11 and 12 may include only wheels or a combination of wheels and tracks.

It is further noted that the number of wheels per side of the pool cleaner may exceed two and that the steering module may use 4×4 steering capabilities and thus may control (independently) the speed of each wheel out of four wheels of the pool cleaner.

Controller 50 is for controlling the steering module.

Elements 42, 42, 43 and 44 may be enclosed by a housing of the pool cleaner.

Figure 2:
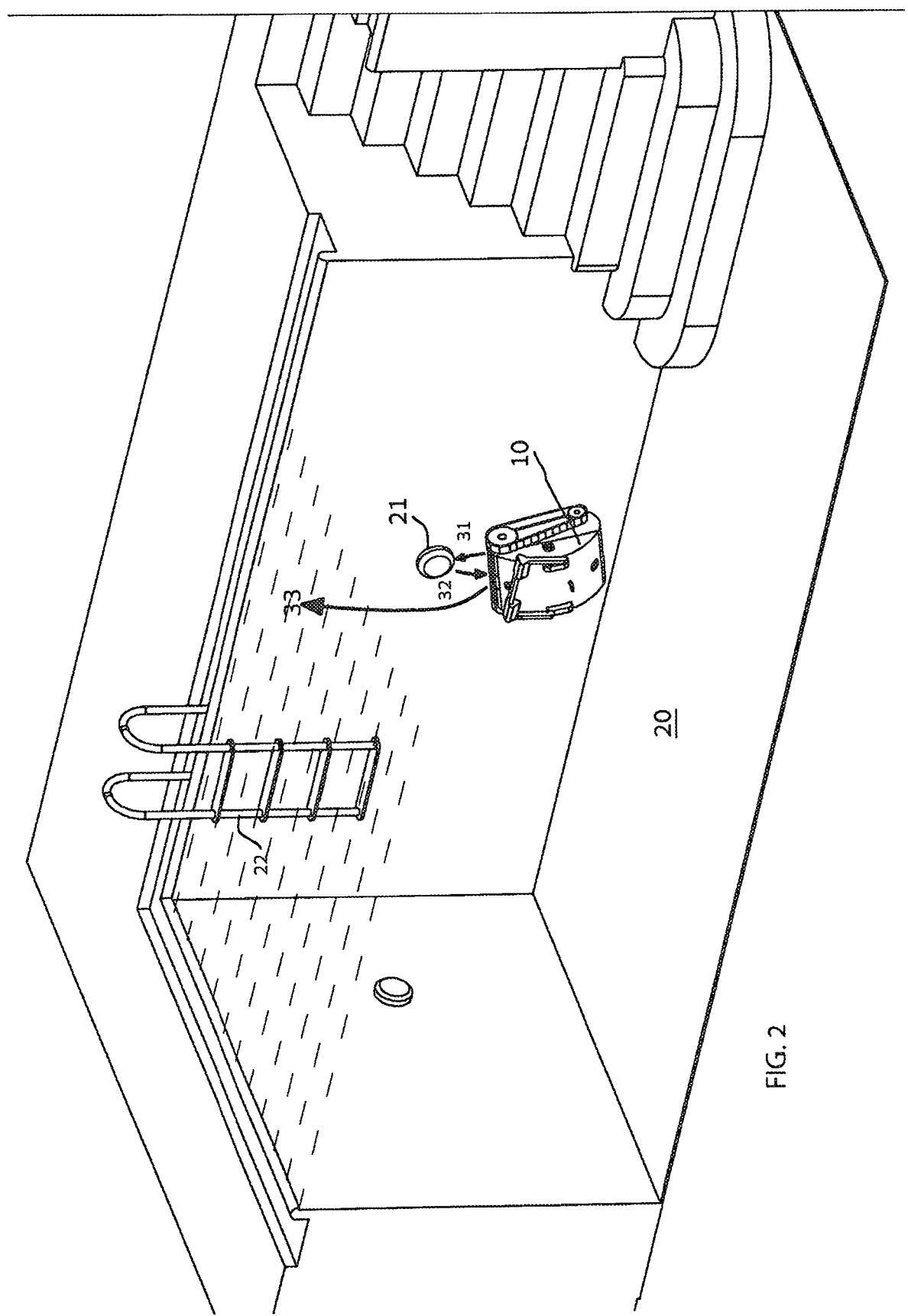
FIG. 2 illustrates a pool cleaner that performs maneuvers for bypassing an obstacle according to an embodiment of the invention.

FIG. 2 illustrates a pool cleaner 10 that performs maneuvers for bypassing an obstacle 21 of a pool 20 according to an embodiment of the invention.

Figure 15:
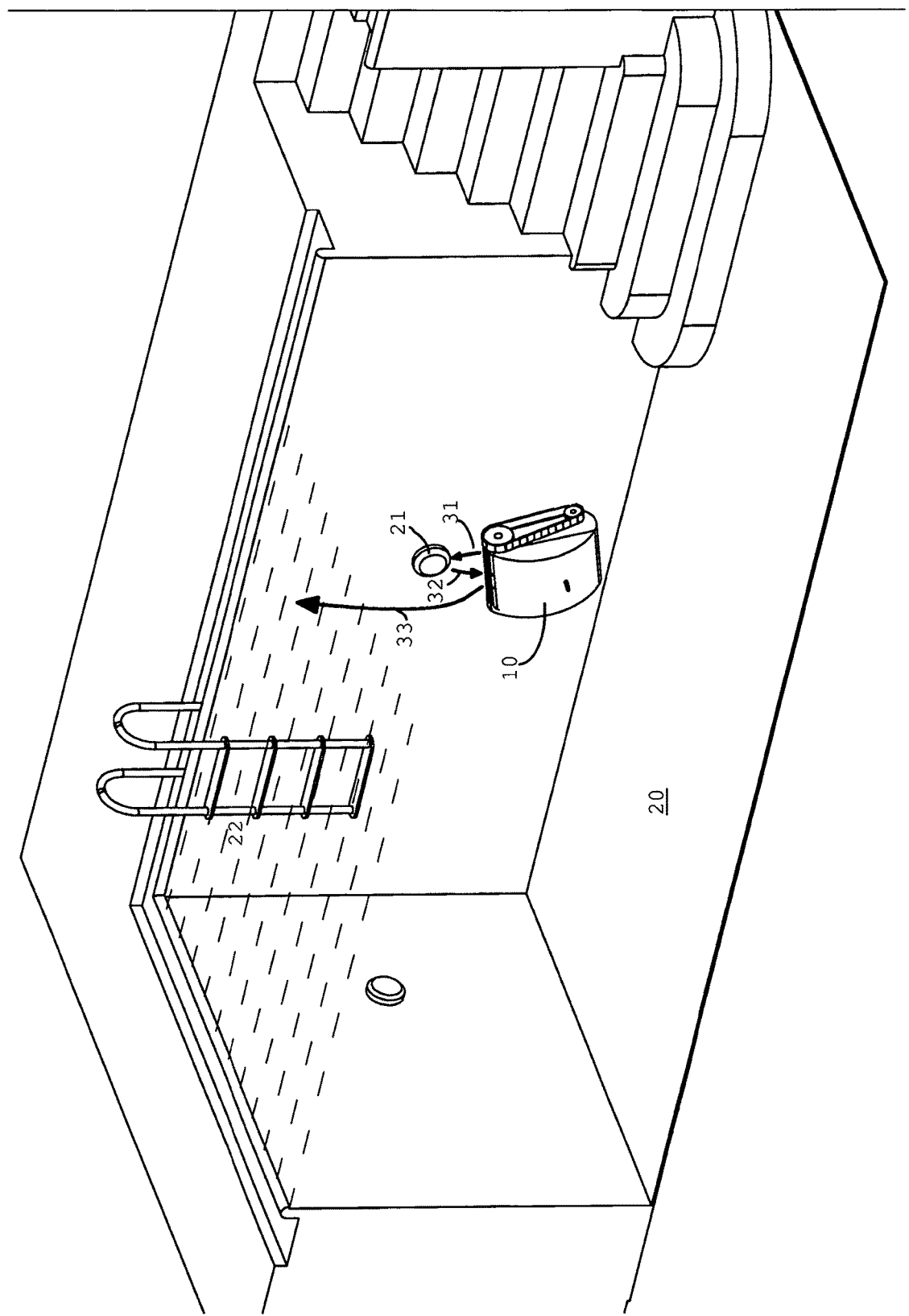
FIG. 15 illustrates a pool cleaner that performs maneuvers for bypassing an obstacle of a pool according to an embodiment of the invention.

While FIG. 2 illustrates a maneuverable, with a floatation/ballast type carrying handle 13 the pool cleaner may have a non-maneuverable handle or may not have any handle at all (See, for example, FIG. 15).

The pool cleaner 10 climbs a sidewall until reaching obstacle 21 (see path segment 31), then moves downwards (path segment 32) and then moves rightwards and upwards (path segment 33) and bypasses obstacle 21.

Path segments 32 and 33 form bypassing maneuvers. The maneuvers may be linear (vertical, horizontal, oriented in relation to x and y axes), nonlinear (curved) or a combination of linear and non-linear maneuvers.

It should be noted that the pool cleaner may perform bypassing maneuvers without first contacting the obstacle (path segment 31 may be obsolete) as the pool cleaner may sense (for example by using an optical sensor or any other sensor) the obstacle before reaching the obstacle. Alternatively, the pool cleaner may learn about (or be fed with) the location of the obstacle in advance and perform the bypassing maneuvers even without sensing the obstacle or contacting the obstacle.

The pool cleaner may also maintain a required waterline angle (a required yaw) by using readings of sensor 52. The sensor 52 may be an inclinometer that can distinguish between the roll (x), pitch (y) and yaw (z) axis. A gyroscope or a combination fusion of gyro and an inclinometer may also be used.

According to an embodiment of the invention the movement of the pool cleaner is a function of the rotation speeds of the wheels/tracks (which is sent by the first and second motors and/or by the first and second transmissions). For example, the motors can rotate faster or slower to compensate each other for a given required trajectory of the pool cleaner. Additionally or alternatively, the first and second transmissions may change the rotation speeds of the tracks/wheels to provide a given required trajectory.

For example—a bigger yaw at the wall ascension and waterline will provide for a bigger angle (left or right) that will provide for faster waterline sideways movements. The angle, the tilting, the positive (between 0 and 90 degrees) or negative (between 0 to 90) degrees yaw and the drive movement speeds are controlled by the drive motors using the following formula to control motors speeds:

$$\text{Delta motors speed} = K \times (\text{required yaw} - \text{actual yaw})$$

Where:
K=coefficient
Actual yaw reading may be derived from inclinometer sensor or a sensor fusion solution such as the sensor fusion solution suggested by Kionix, Inc., based in Ithaca, N.Y., USA.

At the waterline, and whilst in a vertical/perpendicular position in relation to the swimming pool horizontal waterline, as soon as the pool cleaning robot front breaches the waterline the structural combination of physical rotation of the drive motor(s) in tandem with one another eliminates the need to have a flotation handle (in a diagonal or non-diagonal position) to maintain direction stability and control and to move the pool cleaner sideways.

The pool cleaner may not require reaching the top waterline threshold but instead perform a mid-wall sideways turn of up to 90 degrees and travel sideways along the wall while in a horizontal position (or other oriented position) in relation to the pool floor.

Such a horizontal wall travel position may reduce the time of descending back to the floor and climb up again. The cleaning path followed by the pool cleaner may be pre-programmed or selected from a handheld remote control device menu.

The travelling along a wall may be performed in a pre-programmed scanning pattern such as back and forth parallel horizontal (or other non-vertical yaw) path segments.

After finishing cleaning one wall, the pool cleaner may descend and travel to another wall to start the same procedure again.

The pool cleaner may follow a cleaning path that may include a waterline movement. The waterline movement may be triggered in response to the sensing of a change of the yaw that improves the control over the management of the pool cleaner at the waterline by way of holding back the pool cleaner from tipping over and by maintaining the pool cleaner in an attached position in relation to the horizontal waterline and whereby the front transverse section (brush, wheels) of the pool cleaner remains substantially parallel to the waterline irrespective of the increased weight that is exerted on the pool cleaner after it has beached the fluid line into air.

Roll or pitch angles may also keep the cleaner attached to the sidewall (not the yaw).

The pool-cleaning robot may then slide to either left or to the right side and the cleaning brushes are thereby being kept steadily against the waterline to achieve an optimal waterline cleaning. This provides for controlled, smooth and unhindered waterline movements After the predetermined waterline cleaning program period ends, the drive motors reverse direction and a descent from the wall back to the floor commences.

Figure 6:
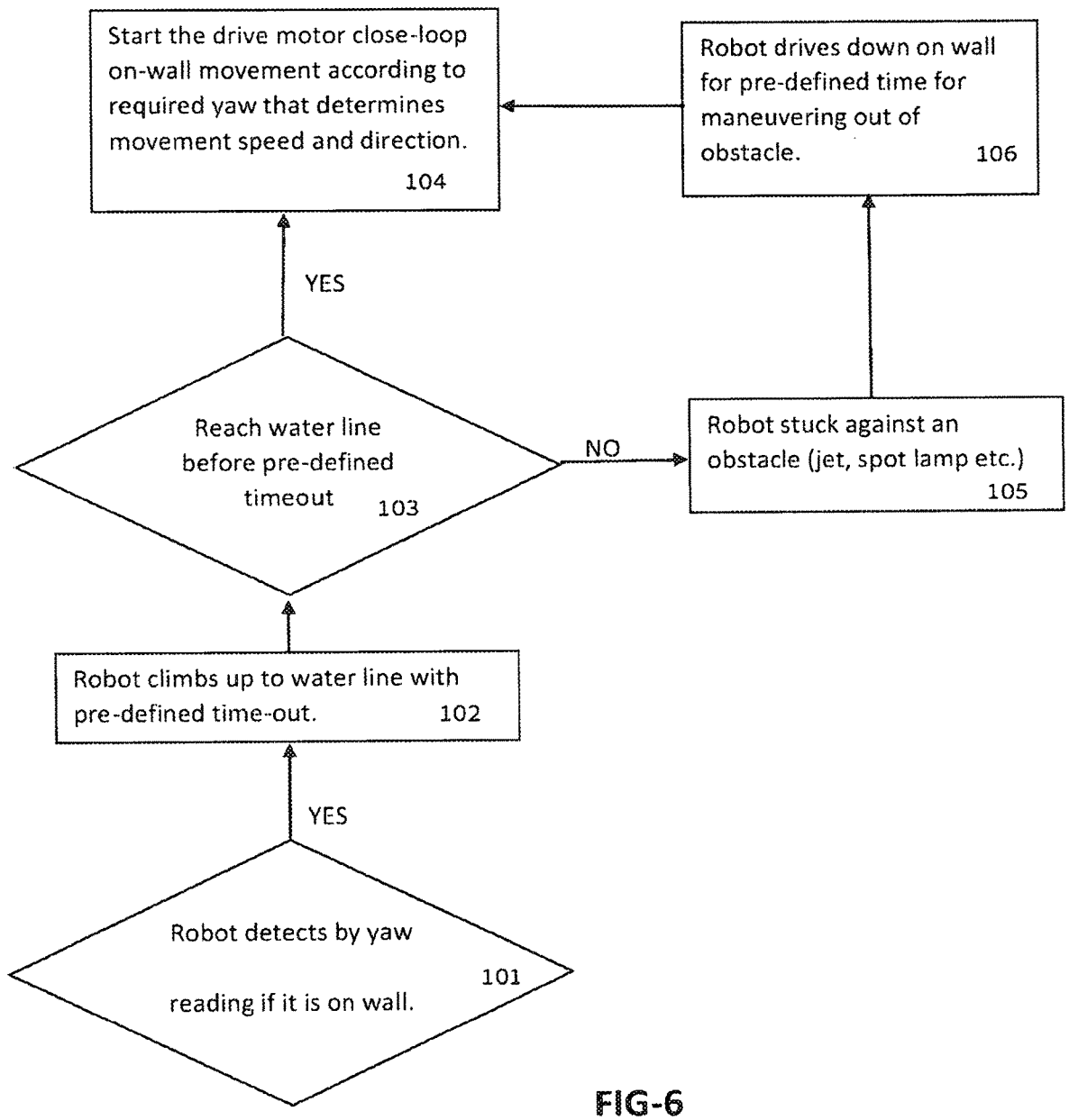
FIG. 6. illustrates a method according to an embodiment of the invention.

The pool cleaner may calculate the approximate time it should take in order for it to reach the waterline. If it has not reached the waterline this may mean that it has encountered wall obstacles some of which, but not exclusively, are depicted in FIG. 6. See steps 101, 102, 103, 104, 105 and 106 of FIG. 6.

FIG. 3 illustrates a pool cleaner that includes housing 14, interface (such as ring 18) for elevating and/or lowering the pool cleaner, interfacing elements such as first track/wheels 11 and second track/wheels 12 as well as a floatation/ballast maneuverable type carrying handle 13 that serves to both carry the cleaner around and also serve as a balancing tool. Such a maneuverable, double purpose handle, is well known in the industry but distinguishes the pool cleaner maneuverability from the preset specification. One or more fluid outlets—such as side fluid outlet 55 and centre fluid outlet 51 are formed in the housing. A fluid inlet may be formed at the bottom of the housing 14. The locations of the fluid inlets and/or outlets as well as the shape, size, number, and locations of the fluid inlets and/or outlets may differ from those illustrated in FIG. 3.

Figure 4:
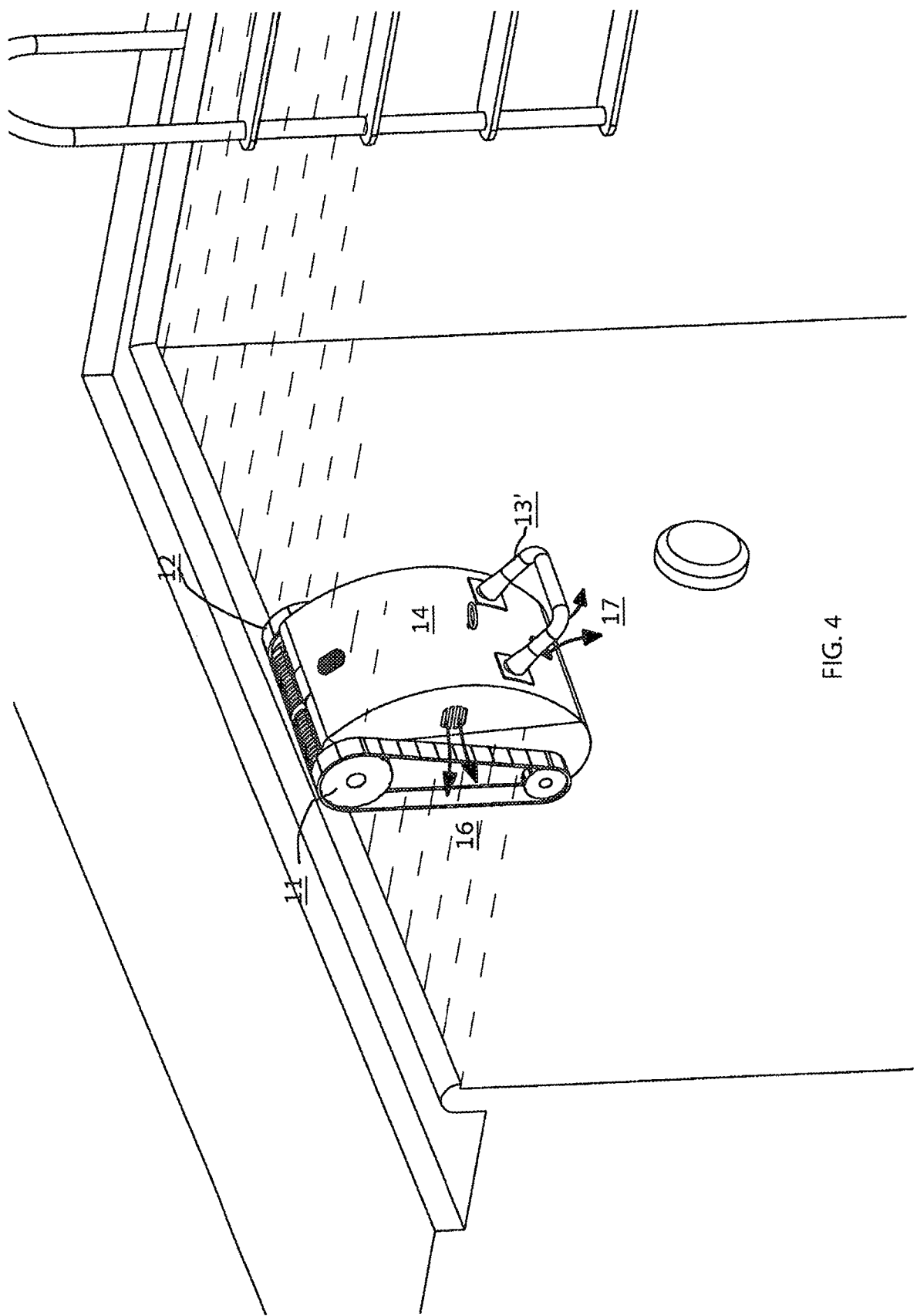
FIG. 4 is a view of a cleaning robot with a "bow-type" carrying handle performing a waterline cleaning maneuverer according to an embodiment of the invention.

FIG. 4 illustrates pool cleaner 10 that includes wheels 11, tracks 12, a fixed (non-manoeuvrable) handle such as bow-type shaped carrying handle 13', housing 14 and multiple apertures (formed in the housing) such as side fluid outlet 55 and centre fluid outlet 51 are formed in the housing.

The terms aperture, inlet and outlet are used in an interchangeable manner.

A jetting module (including at least partially within housing 14) jets fluid 16 through a side fluid outlet and/or jets fluid 17 via centre fluid outlet.

The jetting module may include one or more fluid conduit, one or more flow control element (such as a shutter) for controlling the flow of fluid within the fluid conduit and/or into the fluid conduit and/or outside the fluid conduit, one or more apertures through which the fluid exits the pool cleaner to form one or more jet of fluid, and a mechanism (such as a pump motor) for driving the fluid towards the exit of the fluid conduit. A non-limiting example of a jetting module is illustrated in U.S. Pat. No. 9,222,275 which is incorporated herein by reference.

The pool cleaner may include at least one steering element out of the steering module, the jetting module, and a manoeuvrable handle. The pool cleaner may include only some of these steering elements and/or may include more steering elements or other steering elements.

Figure 5:
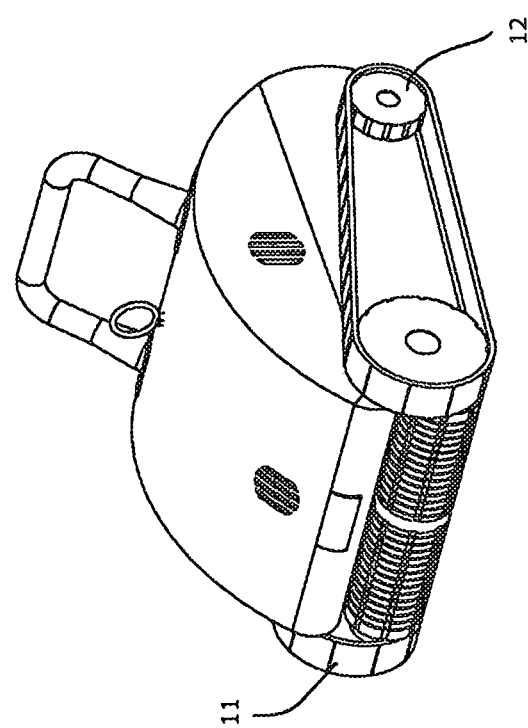
FIG. 5 illustrates a pool cleaner with a "bow-type" carrying handle according to an embodiment of the invention.
Figure 16:
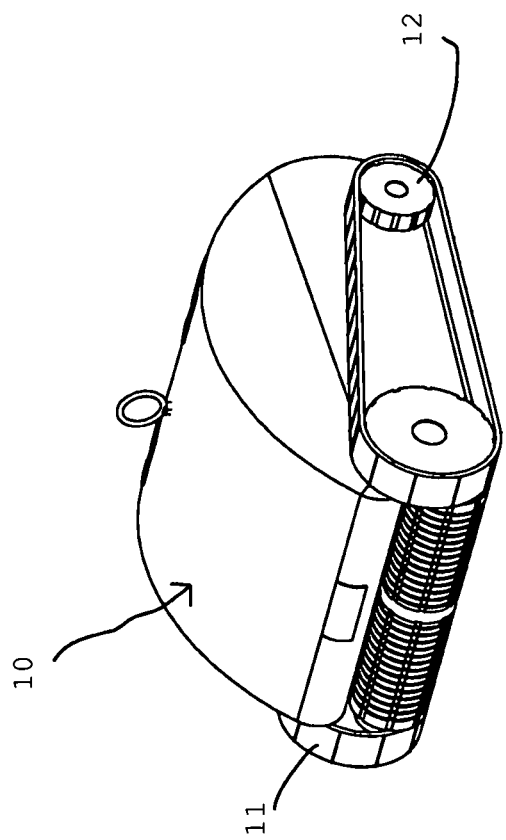
FIG. 16 illustrates the pool cleaner in a horizontal position according to an embodiment of the invention.
Figure 17:
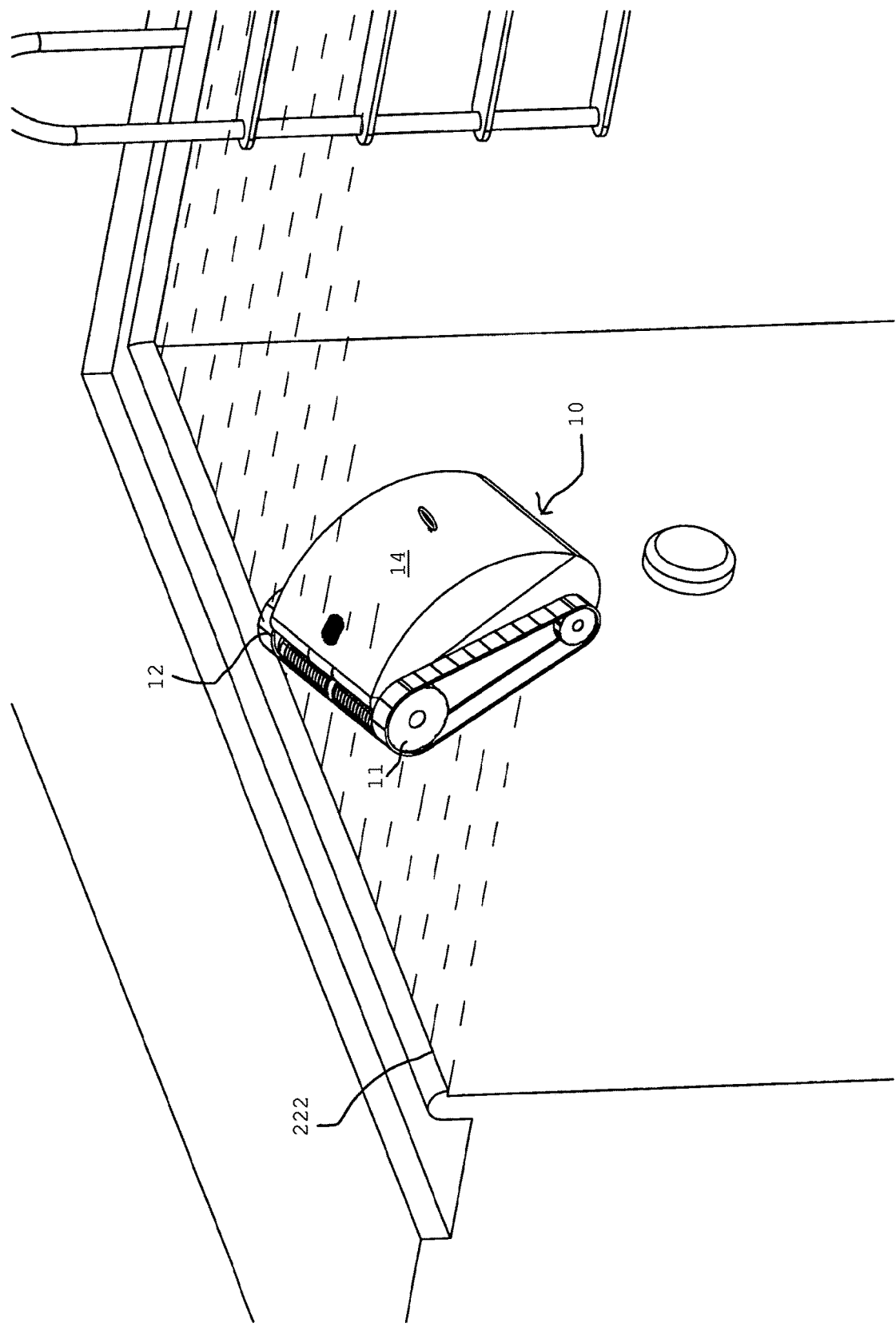
FIG. 17 illustrates a pool cleaner that climbed on the sidewall of the pool and has its front end at an angle at the waterline, according to an embodiment of the invention.

FIG. 4 illustrates pool cleaner 10 that climbed on the sidewall of the pool and has its front end slightly at an angle at the waterline. FIG. 17 illustrates pool cleaner 10 that does not have a handle and does not use jet propulsion, the pool cleaner climbed on the sidewall of the pool and has its front end at an angle at the waterline 222. FIG. 5 illustrates the pool cleaner in a horizontal position. FIG. 16 illustrates the pool cleaner in a horizontal position—wherein the pool cleaner does not have a handle.

Any of the pool cleaners of FIGS. 3, 4, 5, 16 and 17 may or may not include the steering module of FIG. 1.

The pool cleaner of FIG. 17 is more tilted in relation to a vertical axis than the pool cleaner of FIG. 4. It should be noted that the yaw angles of any pool cleaning robot may have any value.

FIG. 6 illustrates a method that includes steps 101, 102, 103, 104, 105 and 106.

Step 101 includes detecting by the pool cleaner (by yaw inclinometer reading) if it reached a sidewall of a pool.

If yes—step 101 may be followed by step 102 of climbing up to water line within a predefined time-out.

Step 102 is followed by step 103 of checking if the pool cleaner reached the water line before the expiration of the pre-defined timeout.

If yes—step 103 is followed by step 104 of starting the drive motor close-loop on-wall movement according to required yaw, that determines movement speed and direction.

If no—step 103 is followed by step 105 of determining that the pool cleaner reaches an obstacle.

Step 105 is followed by step 106 of having the pool cleaner drive down on the sidewall for a pre-defined time for bypassing the obstacle.

Step 106 is followed by step 104.

Figure 7:
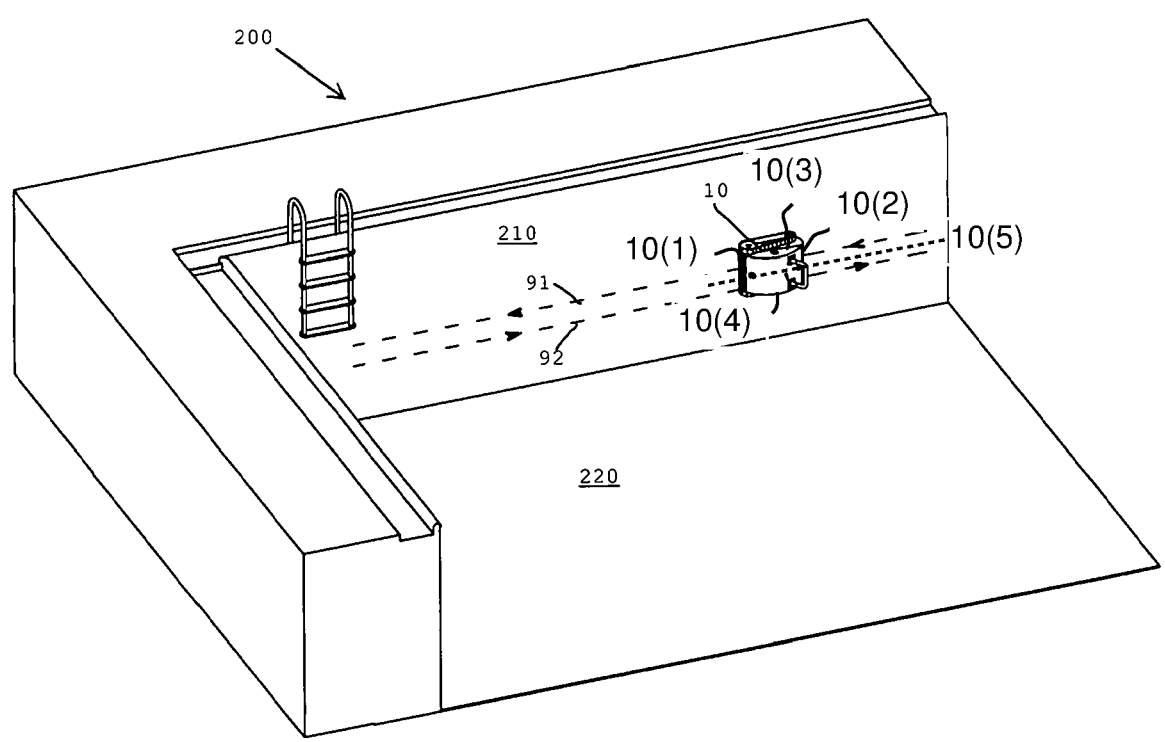
FIG. 7 illustrates a pool cleaner that follows a mid-wall cleaning path according to an embodiment of the invention.

FIG. 7 illustrates a pool cleaner 10 that moves along horizontal cleaning path segments 91 and 92 while cleaning sidewall 210 of pool 200.

The pool cleaner 10 may travel along cleaning path segment 91, make a turn or otherwise move to position itself at cleaning path segment 92 and then move along cleaning path segment 92.

The pool cleaner 10 may travel along cleaning path segment 91, make a turn or otherwise move to position itself at cleaning path segment 92 and then move along cleaning path segment 92.

Figure 8:
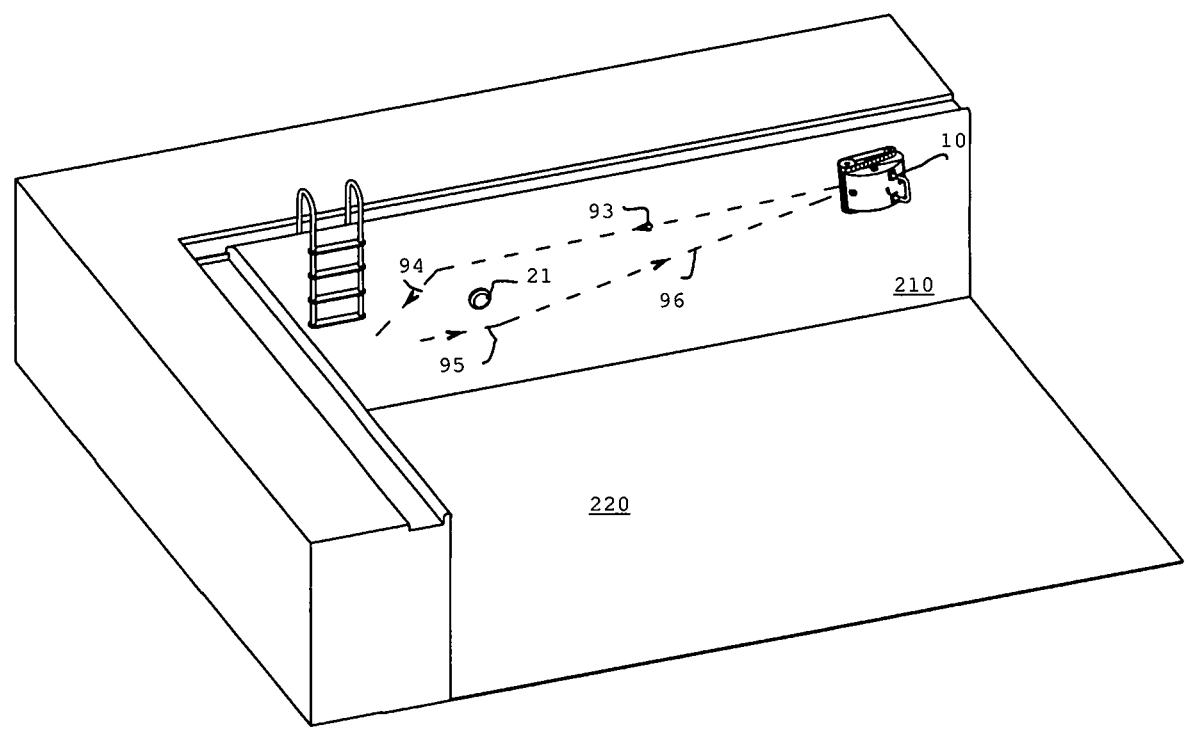
FIG. 8 illustrates a pool cleaner that follows a mid-wall cleaning path according to an embodiment of the invention.

FIG. 8 illustrates a pool cleaner 10 that moves along oriented cleaning path segments 93, 94, 95 and 96 while bypassing obstacle 21 if sidewall 210.

When moving along at least one of cleaning path segments 91, 92, 93, 94, 95 and 96 the pool cleaner may perform a forward movement and/or a backward movement or a substantially linear that may be parallel to the cleaning path segment (longitudinal axis parallel to the cleaning path segment) or be tilted in relation to the cleaning path segment.

Each one of cleaning path segments 91, 92, 93, 94, 95 and 96 has a non-vertical yaw. While cleaning path segments 91, 92, 93, 94, 95 and 96 are linear—the pool cleaner may move along non-linear cleaning paths segments.

Referring to FIGS. 7 and 8—the pool cleaner may clean the entire sidewall 210 or any region of the sidewall 210.

Figure 9:
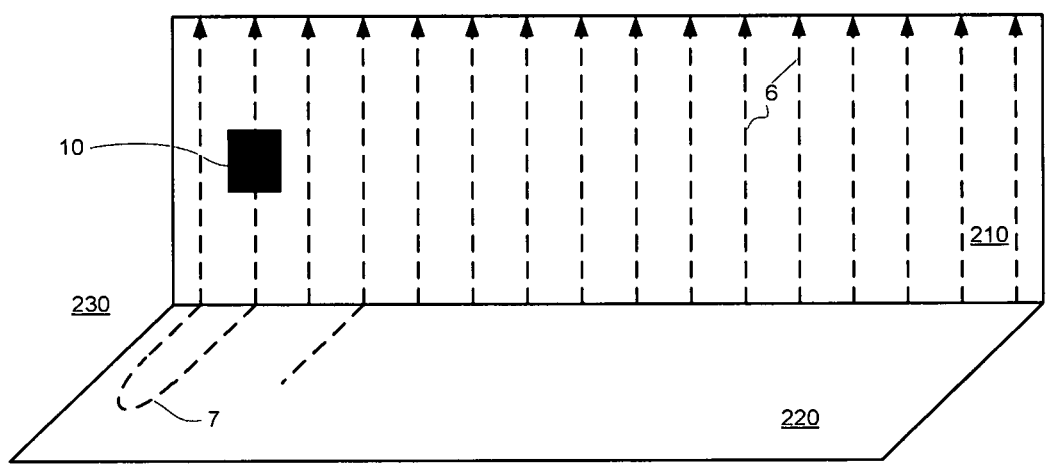
FIG. 9 illustrates a pool cleaner that follows a cleaning path.

FIG. 9 illustrates pool cleaner 10, pool bottom 220, sidewall 210 and another sidewall 230 of the pool.

Pool cleaner 10 follows a cleaning path that includes mostly vertical yaw cleaning path segments 6. After cleaning a vertical yaw cleaning path segment the pool cleaner 10 detach from sidewall 210, and makes one or more turns (7) or other maneuvers on the bottom of the pool and/or on other parts of the pool—before starting to clean another vertical yaw cleaning path segments 6. In order to clean the sidewall, the pool cleaner has to perform at least sixteen turns in order to position itself in front of each vertical yaw cleaning path segments 6 of the cleaning path. The pool cleaner may follow any of the cleaning patterns of U.S. Pat. No. 6,815,918 which is inefficient.

Figure 10:
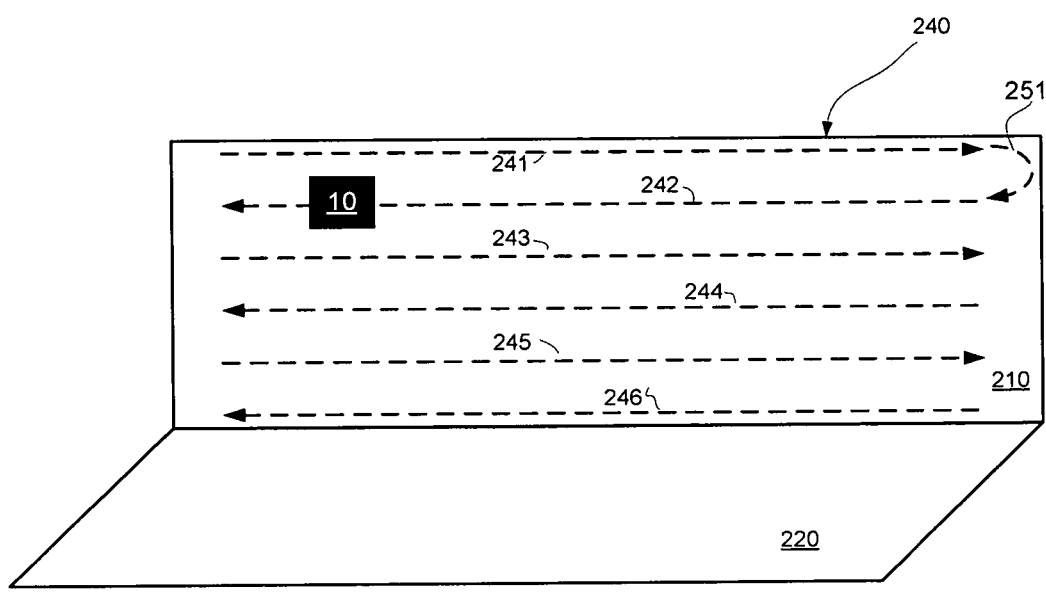
FIG. 10 illustrates a pool cleaner that follows a cleaning path according to an embodiment of the invention.

FIG. 10 illustrates pool cleaner 10, pool bottom 220 and sidewall 210.

Pool cleaner 10 follows a cleaning path 240 that includes cleaning path segments that are non-vertical—such as horizontal path cleaning segments 241, 242, 243, 244, 245 and 246.

The pool cleaner 10 may turn (251) between one cleaning path segment to another- or perform any other maneuver between cleaning path segments 241-246.

Pool cleaner 210 may clean the entire sidewall 210 without touching the bottom of the pool.

Cleaning path 240 include fewer turns or direction changing maneuvers and/or electrical power energy waste than the cleaning path of FIG. 9.

Figure 11:
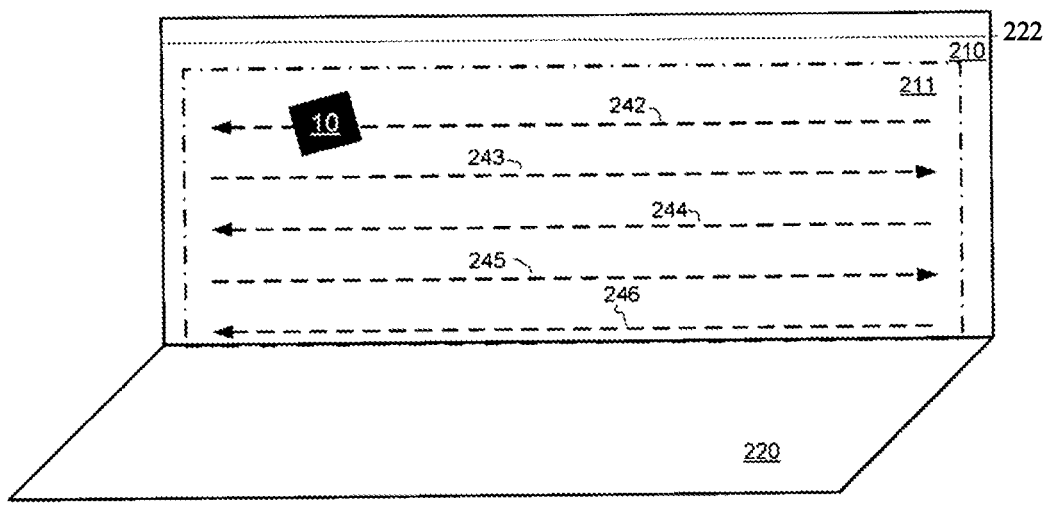
FIG. 11 illustrates a pool cleaner that follows a cleaning path according to an embodiment of the invention.

FIG. 11 illustrates pool cleaner 10, pool bottom 220, sidewall 210 and a region 211 of sidewall 210 that is cleaner by pool cleaner 210. Region 211 is positioned below waterline 222. It is noted that region 211 may include the waterline.

Region 211 may be wider and/or longer than pool cleaner 10 and may span along any portion of sidewall 210.

Figure 12:
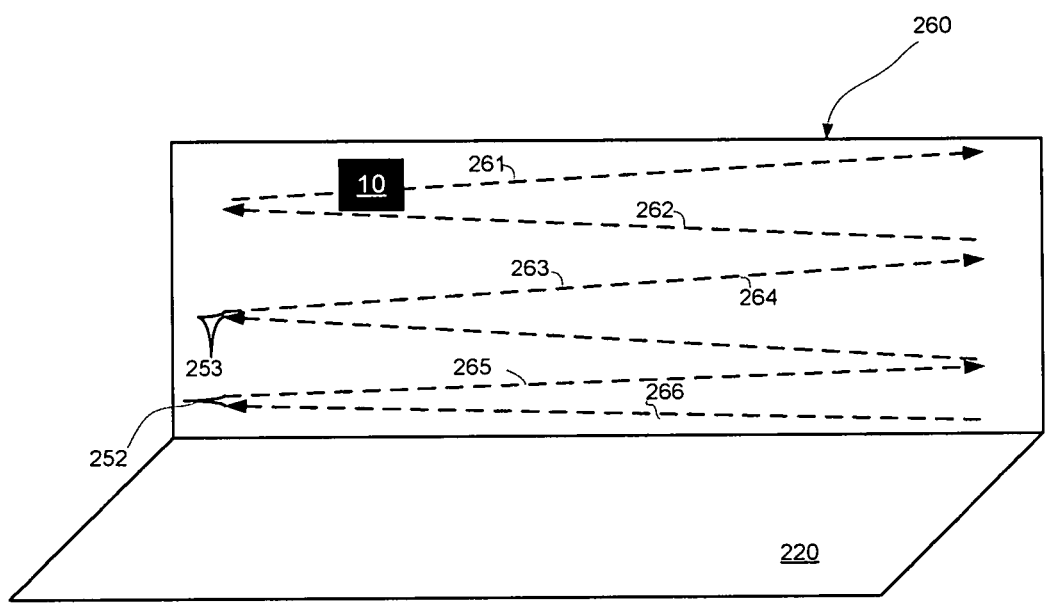
FIG. 12 illustrates a pool cleaner that follows a cleaning path according to an embodiment of the invention.

FIG. 12 illustrates pool cleaner 10, pool bottom 220 and sidewall 210.

Pool cleaner 10 follows a cleaning path 260 that includes cleaning path segments that are non-vertical and non-horizontal—such as oriented path cleaning segments 261, 262, 263, 264, 265 and 266.

The pool cleaner 10 may turn between one cleaning path segment to another- or perform any other maneuver (252, 253) between cleaning path segments 261-266.

Pool cleaner 210 may clean the entire sidewall 210 without touching the bottom of the pool.

Cleaning path 260 include fewer turns or direction changing maneuvers than the cleaning path of FIG. 9.

Figure 13:
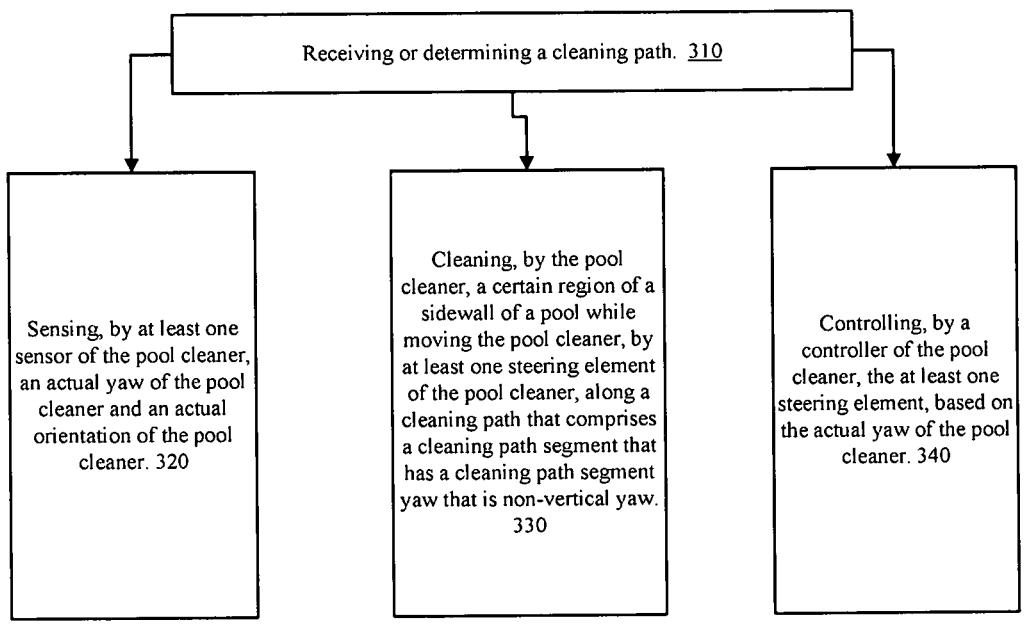
FIG. 13 illustrates a method according to an embodiment of the invention.

FIG. 13 illustrates method 300 according to an embodiment of the invention.

Method 300 may start by initialization step 310 of receiving or determining a cleaning path.

The pool cleaner may determine the cleaning path based on the region to be cleaned (for example the certain region of a sidewall) and one or more parameters. The one or more parameters may include the number of turns that should be made by the pool cleaner in order to clean the certain region, the overall required duration of the cleaning process, and the like.

Step 310 may be followed by steps 320, 330 and 340.

Step 320 may include sensing, by at least one sensor of the pool cleaner, an actual yaw of the pool cleaner and an actual orientation of the pool cleaner.

Step 330 may include cleaning, by the pool cleaner, a certain region of a sidewall of a pool while moving the pool cleaner, by at least one steering element of the pool cleaner, along a cleaning path that comprises a cleaning path segment that has a cleaning path segment yaw that is non-vertical yaw.

Step 340 may include controlling, by a controller of the pool cleaner, the at least one steering element, based on the actual yaw of the pool cleaner. The controlling may include attempting to maintain the pool cleaner on the cleaning path, correcting errors such as yaw errors, and the like.

Regarding method 300, at least one of the following is true:

a. The controller is configured to determine the cleaning path to include a minimal number of pool cleaner turns.
b. The controller is configured to determine the cleaning path to include less than a predetermined number of turns; wherein the predetermined number of turns is associated with a cleaning path that mostly includes vertical yaw cleaning path segments.
c. The certain region is fully submerged.
d. The pool cleaner includes at least one steering element that may include a steering module that is configured to independently drive different interfacing elements of the pool cleaner. Each interfacing element interfaces between the pool cleaner and the pool.
e. The pool cleaner includes at least one steering element that is configured to move the pool cleaner along the cleaning path while performing a minimal number of turns.
f. The pool cleaner includes at least one steering element that is configured to move the pool cleaner along the cleaning path while performing less than a predetermined number of turns. The predetermined number of turns is associated with a cleaning path that mostly includes vertical yaw cleaning path segments.

Figure 14:
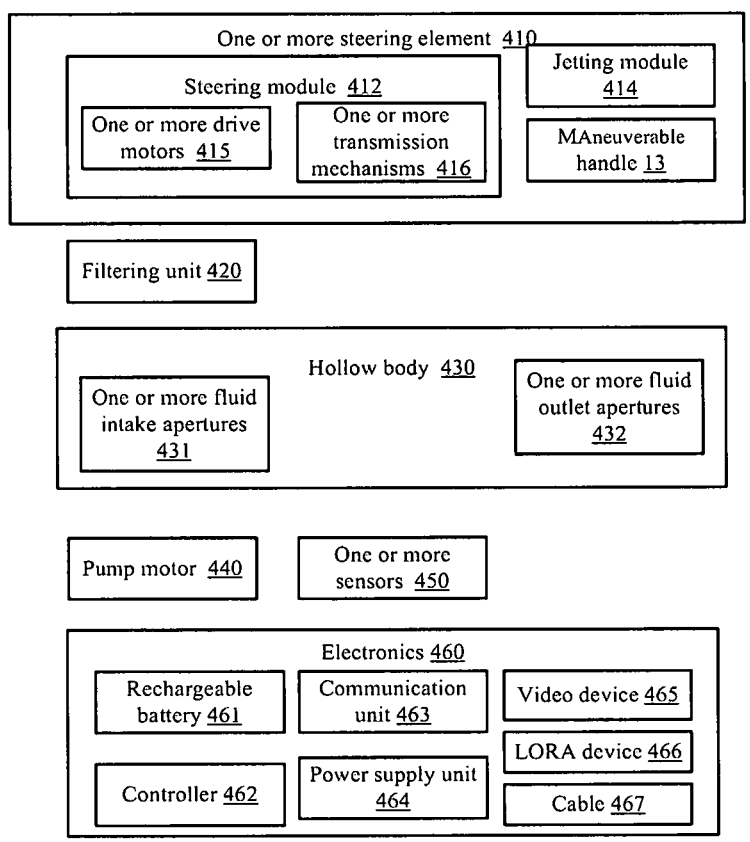
FIG. 14 illustrates a pool cleaner according to an embodiment of the invention.

FIG. 14 illustrates pool cleaner 10—and especially shows some of the components that may be included in pool cleaner 10—some of which were not illustrated in the previous figures—and some were illustrated in previous figures.

Pool cleaner 400 may include at least one of the following elements:

a. A hollow body 430,
b. A fluid intake aperture 431,
c. A fluid outlet aperture 432,
d. A hydraulic path stretching between the said intake and outlet,
e. A filtering and/or sieving element (filtering unit 420) positioned inside the said hydraulic path,
f. A pumping motor (such as pump motor 440) positioned in the hydraulic path,
g. One or more drive motors 415, h. One or more transmission mechanisms 416 such as one or more gears and or wheel connecting shafts.
i. Interfacing elements such as wheels, tracks and the like,
j. Pool surface dirt brushes or scrappers,
k. Auxiliary brushing or scrapping member,
l. At least one carrying floatation handle or a "bow-type" handle,
m. Electronics 460 that may include one or more out of:
  i. Electrical tethered power supply cable 467,
  ii. Rechargeable battery 461,
  iii. A communication unit 263 for communicating (wirelessly or in a wired manner) with another device (submerged and/or above-the-water device).
  iv. Controller 463.
  v. Power supply unit 464.
  vi. Video device 465 that captures, memorizes locations of pool features or obstacles and calculates the relative angle and distance of the robot from these features to further calculate the robot location in the pool.
  vii. A lighting optical recognition aid (LORA) device 466 for night time and/or for high turbidity conditions that may also employ an infrared light device.
n. One or more sensor 450 such as a camera, a yaw sensor, an inclination sensor, a motion sensor, a gyroscope, a laser and/or a tilt wall recognition sensor, a turbidity sensor, a heading direction measurement sensor such as magnetometer, a compass, a gyrocompass, an impact sensor, a pressure sensor, a pump motor velocity sensor, a current sensor, and the like.

Figure 18:
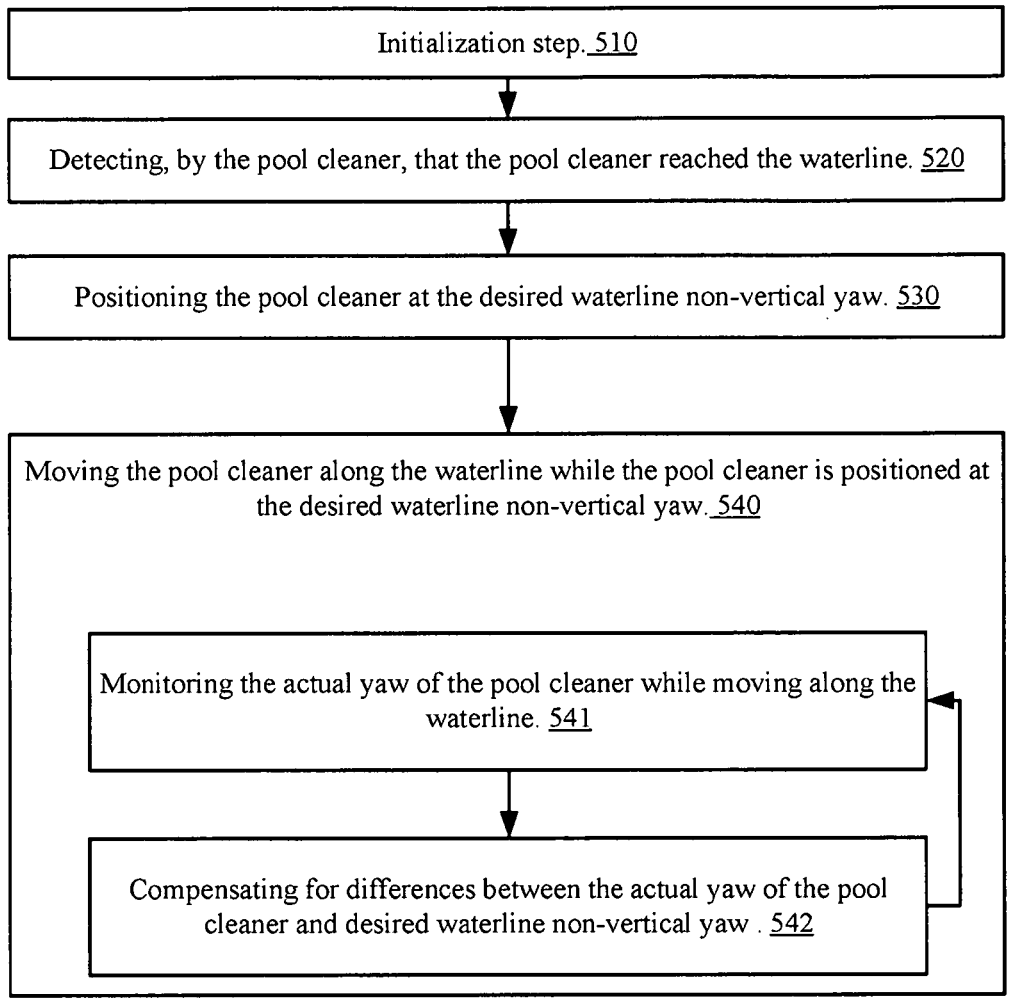
FIG. 18 illustrates a method according to an embodiment of the invention.

FIG. 18 illustrates method 500.

Method 500 starts by initialization step 510.

Initialization step 510 may include receiving a desired waterline non-vertical yaw. The pool cleaner will have to attempt to move along the waterline at the desired waterline non-vertical yaw.

The desired waterline non-vertical yaw may be defined by a user, by a manufacturer of the pool cleaner or ay any party.

Different yaw may be associated with different propagation speed of the pool cleaner. For example—the smallest propagation speed may be associated with a vertical yaw and may increase as the non-vertical yaw is closer to a horizontal yaw.

A party (user, manufacturer or any third party) may feed a desired propagation speed (such as a desired waterline propagation speed) and the pool cleaner, third party or user controller (computer that is configured to send commands to the pool cleaner) may convert the desired propagation speed to the desired waterline non-vertical yaw.

Initialization step 510 may be followed by step 520 of detecting, by the pool cleaner, that the pool cleaner reached the waterline. The pool cleaner may use any sensor and/or any technique to sense that the pool cleaner reached the waterline. Yaw sensors, timers (may count the time from the start of the climbing of the sidewall), pressure sensors, weight sensors, image sensor or any other sensors.

Step 520 is followed by step 530 of positioning the pool cleaner at the desired waterline non-vertical yaw.

It should be noted that step 520 may include detecting, by the pool cleaner, that the pool cleaner is proximate (for example—below 20 centimeters, or any predefined distance) to the waterline (before reaching the waterline), and starting step 530 before reaching the waterline.

Step 530 may be followed by step 540 moving the pool cleaner along the waterline while the pool cleaner is positioned at the desired waterline non-vertical yaw.

Step 540 may allow temporal deviations from the desired waterline non-vertical yaw—and may include attempting to correct these deviations.

Step 540 may include step 541 of monitoring the actual yaw of the pool cleaner while moving along the waterline and step 542 of compensating for differences between the actual yaw of the pool cleaner and desired waterline non-vertical yaw.

Step 542 may include using any steering element illustrated in the specification or any combination of any steering elements illustrated in the specification.

For example—step 542 may be executed using only a steering module that is configured to independently drive different interfacing elements of the pool cleaner; wherein each interfacing element interfaces between the pool cleaner and the pool.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "rear" "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Those skilled in the art will recognize that the boundaries between various components are merely illustrative and that alternative embodiments may merge various components or impose an alternate decomposition of functionality upon various components. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" Each other such that the desired functionality is achieved, irrespective of architectures or intermedial components. Likewise, any two components so associated can also be viewed as being "operably connected," or "operably coupled," to Each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A pool cleaner for cleaning a pool, the pool cleaner comprising:
   a filtering element for filtering fluid;
   at least one sensor for sensing an actual yaw of the pool cleaner and an actual orientation of the pool cleaner;
   a controller;
   at least one steering element that comprise a steering module that is constructed and arranged to independently drive different interfacing elements of the pool cleaner thereby moving the pool cleaner along a cleaning path while the pool cleaner is fully submerged, during a cleaning process of a certain region that covers at least a majority of a sidewall of the pool; wherein each said interfacing element interfaces between the pool cleaner and the pool;
   wherein the controller is constructed and arranged to control, based on the actual yaw of the pool cleaner, the at least one steering element to propagate along the cleaning path,
   wherein the cleaning path mostly includes cleaning path segments that have cleaning path segment yaws that are non-vertical; wherein a propagation along the cleaning path involves less numbers of turns than a propagation along another cleaning path that mostly includes propagating along cleaning path segments having a vertical yaw.

2. The pool cleaner according to claim 1 wherein the non-vertical yaws are horizontal.

3. The pool cleaner according to claim 2 wherein the at least one steering element is configured to move the pool cleaner at a backward direction along the cleaning path segment.

4. The pool cleaner according to claim 2 wherein the pool cleaner is configured to contact the certain region of the sidewall of the pool while performing a horizontal movement along the certain region of the sidewall of the pool.

5. The pool cleaner according to claim 1 wherein the different interfacing elements of the pool cleaner are positioned at opposite sides of the pool cleaner.

6. The pool cleaner according to claim 1 wherein certain region comprises an obstacle.

7. The pool cleaner according to claim 1 wherein the at least one steering element is configured to move the pool cleaner along multiple cleaning paths of the cleaning path, each of the multiple cleaning paths has a cleaning path segment yaw that is non-vertical yaw.

8. The pool cleaner according to claim 7 wherein the multiple cleaning path segments overlap most of the certain region.

9. The pool cleaner according to claim 7 wherein the at least one steering element is configured to move the pool cleaner along the cleaning path while maintaining in contact with the pool sidewall.

10. The pool cleaner according to claim 9 wherein the certain region is longer and wider than the pool cleaner.

11. The pool cleaner according to claim 7 wherein a plurality of pool cleaning path segments out of the multiple pool cleaning paths are parallel to each other and wherein the at least one steering element is configured to turn the pool cleaner when moving between the plurality of pool cleaning path segments while maintaining contact with the pool sidewall.

12. The pool cleaner according to claim 1 wherein the controller is configured to determine the cleaning path to include a minimal number of turns.

13. The pool cleaner according to claim 1 wherein the controller is configured to determine the cleaning path.

14. The pool cleaner according to claim 1 wherein the at least one sensor is configured to detect that the pool cleaner reached a waterline; wherein the controller is configured to control the at least one steering element to position the pool cleaner at a non-vertical yaw and to move the pool cleaner along the waterline while the pool cleaner is positioned at the non-vertical yaw.

15. The pool cleaner according to claim 14 wherein the pool cleaner is configured to receive a waterline propagation speed value, and to determine a value of the waterline non-vertical yaw based on the waterline propagation speed value.

16. The pool cleaner according to claim 1 wherein the non-vertical yaws are non-horizontal.

17. The pool cleaner according to claim 1 wherein the cleaning path segments that have cleaning path segment yaws that are non-vertical comprises first cleaning path segments of a first non-vertical yaw and second cleaning path segments of a second non-vertical yaw; wherein the first non-vertical yaw is oriented to the second non-vertical yaw.

18. The pool cleaner according to claim 17 wherein the pool cleaner is without a maneuverable handle.

\* \* \* \* \*